Nov. 10, 1970     H. G. SCHIRMER     3,539,666

METHOD FOR PREPARING A NONWOVEN FABRICLIKE MEMBER

Filed June 18, 1968     15 Sheets-Sheet 1

INVENTOR

HENRY G. SCHIRMER

BY: Edward J. Hanson Jr.

ATTORNEY

INVENTOR
HENRY G. SCHIRMER
BY: Edward J. Hanson Jr.
ATTORNEY

FIG. II

ACTUAL SIZE

MAGNIFIED TO THE FIFTH POWER

# United States Patent Office 3,539,666
Patented Nov. 10, 1970

3,539,666
METHOD FOR PREPARING A NONWOVEN FABRICLIKE MEMBER
Henry G. Schirmer, Spartanburg, S.C., assignor to W. R. Grace & Co., Duncan, S.C., a corporation of Connecticut
Continuation-in-part of application Ser. No. 351,751, Mar. 13, 1964. This application June 18, 1968, Ser. No. 737,957
The portion of the term of the patent subsequent to Sept. 24, 1985, has been disclaimed
Int. Cl. B29d 27/00
U.S. Cl. 264—51      5 Claims

ABSTRACT OF THE DISCLOSURE

This invention is directed to a method for producing a nonwoven fabric that is continuous and free of independent separate fibers. The method for producing such a fabric includes drawing a cellular structure at its hardening-orientation temperature over a shaped surface to stretch the cell walls until they rupture while also stretching the fabric desirably.

---

This application is a continuation-in-part of my copending application, Ser. No. 351,751, filed Mar. 13, 1964, now Pat. No. 3,403,203.

The present invention relates to nonwoven fabrics and methods and apparatus for producing such fabrics.

Nonwoven fabrics are well known products. These fabrics have been made in the past from a wide variety of fiber materials including such fibers as cotton, flax, wood, silk, wool, jute, asbestos, ramie, "rag," or abaca; mineral fibers such as glass; artificial fibers such as viscose rayon, cupra-ammonium rayon, ethyl cellulose or cellulose acetate; synthetic fibers such as polyamides such as nylon, polyesters, polyolefins such as polyethylene, polymers of vinylidene chloride such as Saran, polyvinyl chloride, polyurethane, etc., alone or in combination with one another.

The methods for producing nonwoven fabrics in the past have generally involved many expensive and time consuming operations. In making nonwoven fabrics from synthetic materials, e.g., viscose rayon, polyethylene, etc., the process generally included the fiber production steps, i.e., spinning of the monofilament; bleaching, washing, etc., as required or necessary; and cutting or chopping into fibers which were dried and baled or otherwise packaged for shipment to the user. Ordinarily the fibers were unbaled or unpackaged, cleaned, "opened" (i.e., treated so as to straighten out all curled, bent and/or twisted fibers), and carded to form a continuous web. Preferably the individual fibers of the web were randomly distributed so that the web would have equal strength in all directions.

Then the fibers were bonded together in some manner in order to form the finished nonwoven fabric. The generally known bonding methods are described in Kirk-Othmer "Encyclopedia of Chemical Technology," vol. 13, page 865 (1954). This description is incorporated herein by reference thereto.

An object of the invention is to provide a new and improved method for producing nonwoven fabrics that may be expediently controlled to assure the production of nonwoven fabrics having substantially uniform characteristics throughout their dimensions.

Briefly stated, in carrying out my invention, in one form thereof, I have provided a nonwoven fabric consisting of one continuous sheet of plastic having continuous branching fibril structure across the length and width of the fabric with fibril orientation both longitudinally and transversely of the fabric. This nonwoven fabric exhibits at least 25% shrink in both directions when subjected to high temperature conditions sufficient to relax the orientation. More preferably, the longitudinal shrink is at least 50%. This nonwoven fabric is substantially free of overlapping fibrils.

By an aspect of my invention I have provided a method for preparing a nonwoven fabric wherein a plastic sheet with a cellular structure is formed. This plastic sheet is brought to its orientation temperature and then drawn at this temperature over a shaped surface to stretch the cell walls of the plastic sheet's cellular structure until they rupture, producing a nonwoven fabric. The plastic sheet is formed by extruding a plastic tube. The plastic tubular sheet is brought to its hardening orientation temperature by cooling the plastic sheet directly from its extrusion temperature. The plastic sheet is drawn over a shaped surface, that is a mandrel, having a larger peripheral circumference than the interior peripheral cross section of the plastic tube. The mandrel has a frustoconical end pointing upstream and thereby the tube is stretched until the cell walls of the cellular structure are ruptured to produce the nonwoven fabric. Some of the cell walls may be ruptured prior to the stretching of the fabric by the enlarged peripheral dimension of the mandrel by drawing the tube away from the die at a rate sufficiently higher than the rate of extrusion to overextend the cell walls and rupture them. As the mandrel stretches the tube transversely the drawdown of the tube continues to stretch the tube longitudinally to provide biaxial stretch and orientation. The plastic tubular sheet is cooled as it exits from the die, e.g., by impinging fluid air against the tubular sheet substantially in the area where it exits from the extrusion die. The mandrel is cooled to further cool the plastic tubular sheet. The mandrel not only stretches the plastic tubular sheet and provides resistance against its drawdown but also collapses the sheet so that it may be delivered between pinch rolls, which supply the drawdown force to the sheet to draw it away from the die and across the mandrel. The plastic tubular sheet is preferably drawn over a mandrel that has a frusto-conical mandrel head that is circular at its base with a cylindrical portion downstream from the circular base having its upstream periphery engaged with and coextensive with the base periphery of the mandrel head. The cylindrical portion extends downstream to a flattened edge and the intermediate portions of the cylindrical portion of the mandrel change between these two shapes in a subsantially uniform uninterrupted dimensional change. This mandrel shape guides the fully stretched plastic tubular sheet in taut condition to a collapsed condition and then directly feeds it into the bite of the pinch rolls.

In carrying out my invention I have provided an improved apparatus for working tubular plastic to enlarge the cross section of the tube and flatten the tube for windup. An annular extrusion die is provided for forming the tubular plastic member. A mandrel is positioned adjacent to the extruder die. This mandrel has a frustoconical cone aimed at the extrudes die and centered with the annulus of the extruder die. The cone has a base larger in diameter than the annulus of the extruder die. The mandrel has a cylindrical portion downstream of the cone and of equal external dimensions with the base of the cone, aligned with the cone, connected to and coextensive with the base of the cone, and extending from the base of the cone. The end of the cylinder is flattened to a straight edge and the change in dimension from the base of the cone to the flattened straight edge is a substantially uniform uninterrupted dimensional change. means are provided beyond the mandrel for drawing the tubular plastic member over the mandrel.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawings in which:

FIGS. 4 through 15 are actual size.

This invention is based upon the discovery that products similar to nonwoven fabrics in appearance and in utility can be produced by extruding a foamable thermoplastic composition to form an elongated cellular member, stretching the cells in the member an amount sufficient to rupture at least a majority of the individual cells and then cooling the resultant member to temperatures below the softening point of the polymer.

In a preferred embodiment that makes it possible to expediently control the uniformity of the nonwoven fabric to relatively close tolerances the thermoplastic material is extruded through an annular die into an area of reduced pressure to form a seamless cellular tube which is biaxially stretched by drawing over a mandrel having a diameter larger than the diameter of the tube at a rate sufficient to rupture a substantial portion of the individual cells in the tube thus forming a porous web-like structure resembling a nonwoven fabric. The resultant structure is cooled, drawn off of the mandrel and slit, if desired, to form a sheet.

The extruded film or tubing may vary in thickness over a wide range. The thicker the cellular structure the more stretching is required to rupture the cells. A preferred cellular film or tubing is 1 to 50, more preferably 5–20, mils thick and, after stretching, a substantial portion of the cells have been broken or ruptured. However, overstretching will reduce the strength of the resultant nonwoven fabriclike member. Preferably, the cellular film or tubing is stretched in two directions or biaxially. Preferably the film is stretched in both directions at least twice, more preferably 2 to 10 times, its original dimension. Operating in accordance with the procedures described in detail here it is generally necessary to orient more highly in the longitudinal direction than in the transverse direction, generally 2–10 times greater in the longitudinal direction.

As used herein "hardening temperature" means a temperature at which a polymer material no longer stretches as a film but pulls apart leaving a rupture. This temperature is usually close to a temperature at which a significant amount of crystallization or recrystallization takes place for crystalline polymers and for noncrystalline polymers a temperature at which a significant amount of the material is at or below the glass transition temperature. "Orientation temperature" means a temperature at which some significant degree of orientation will occur and "hardening-orientation point" or "hardening-orientation temperature" means a temperature at which both conditions exist to some significant extent or more exactly to the temperature having those characteristics that result in the production of the nonwoven fabric described in this application.

Figures 1, 1A:
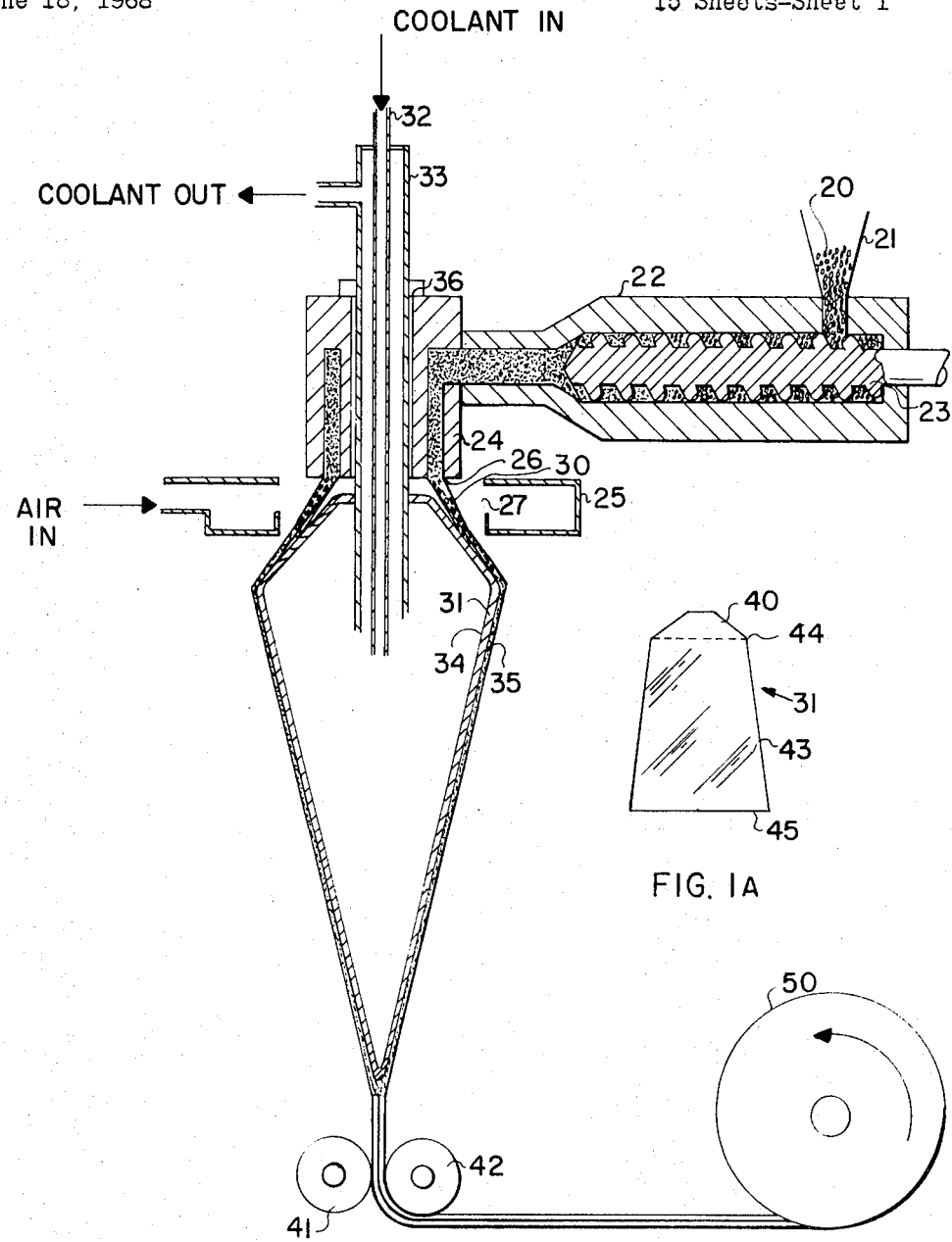
FIG. 1 is a schematic diagram showing the extruding of the foamed plastic material and its orientation and rupture as it is drawn over a mandrel.
FIG. 1A is a schematic diagram of the mandrel 31 of FIG. 1 on a reduced scale showing a view of the broad side of the mandrel.

FIG. 1 is a schematic diagram illustrating one embodiment for preparing the highly porous nonwoven fabriclike materials of this invention. The compounded homogeneous foamable composition 20 prepared previously, for example, by tumbling in a tumbler blender (not shown), is fed into hopper 21 which feeds a conventional extruder 22. A screw 23 is provided in the extruder 22 for working and propelling the composition or mixture 20 from the feed-in hopper 21 to the discharge end of extruder and through annular die 24. The extruder and annular die may be heated in any suitable manner, such as by electrical resistance type band heaters thermally controlled by electrical circuitry activated by thermocouple sensors located within the metal parts. Generally the pressure within the extruders will maintain the polymer in unfoamed condition until its exit from the die head. This would, however, not be essential so long as the foamed cellular structure is provided in the extrudate. The cellular structure is required in the melted extrudate because the cellular structure separates the polymer just prior to the biaxial stretching and initiates a state of openness. Otherwise an uninterrupted film would be formed. Generally it is preferable to maintain the polymer unfoamed until its exit from the die by maintaining sufficient pressure on the polymer in the extruder to prevent foaming. Thus as the polymer exits from the die it will enter an area of reduced pressure, normally atmospheric, and immediately begin to expand to foam due to the release of pressure on the gaseous material formed from a blowing agent.

A cooling means, cooling ring 25, is provided directly adjacent the lips 26 of the die 24 for immediately bringing the temperature of the polymer from its softening-extrusion point to its hardening-orientation point. Cooling ring 25 is of the air cooling type and has a continuous outlet 27 around its upper inner periphery directing air against the foamed polymer 30 as it exits from the lips 26. The air ring should be so related to the die that it does not excessively cool the die either by careful direction of the jets of air from the ring or by insulation of the die; thus preventing interference with the efficiency of the die. Other cooling means could be employed in place of the air ring, for example, water jets.

It is generally necessary to bring the polymer down close to its hardening temperature almost immediately upon its exit from the die in order to build up the viscosity of the polymer so that it may be oriented to a high degree. This high orientation imparts high tensile strength to the sheet or web of plastic. The fluid medium being impinged upon the plastic tube as it exits the die should be at such a temperature as to bring this condition about and the specific temperature necessary will depend upon the working conditions and, in particular, upon the material being extruded.

A tube working mandrel is provided external of the die for shaping, stretching and thereby orienting the tube as it exits from the die. The mandrel 31 should preferably have at least twice the circumferential dimensions of the die lips. Generally a circular configuration is preferable to create a uniform material of uniform characteristics. However, in particular applications, a mandrel with a lesser circumferential dimension or a different mandrel shape relative to the die outlet may be preferable.

As may be seen in FIG. 1 the mandrel 31 is cooled by supplying cooling air through the inlet conduit 32 and the air is allowed to exit from the mandrel 31 through the outlet conduit 33. Of course, other fluids such as water or oil or other types of coolants could be used. The cooling air comes into contact with the inner surface 34 of the mandrel to cool the wall of the mandrel and thereby bring the outer surface 35 of the mandrel 31 to the desired temperature. Of course, if desired different areas of the mandrel could be readily cooled and heated to varying temperatures by means, such as providing coils carrying fluids of different temperatures inside of the mandrel in contact with the inside mandrel surface 34. It is preferable that the mandrel be spaced as close to the die outlet as possible without directly contacting the die so as to contact the tubing as soon as possible and assist in cooling it. The mandrel and the die should not generally be transferring temperature directly back and forth through their direct engagement. Insulation or space providing an insulating effect may be provided between the die and the coolant conduits as at 36.

The particular mandrel shown in FIGS. 1 and 1A is an important aspect of my invention. Mandrel 31 has an upper cone shaped portion 40 for shaping and orienting the tubing 30 as it is drawn down onto the mandrel by the pinch rolls 41 and 42. The upper portion of the mandrel is a cone shaped working surface 40 which is frustoconical to allow a closer positioning of the working surfaces of the mandrel with the die 24. The cone could have an elliptical or even an irregular bottom or base 44 shape rather than a circular shape if some special and particular fabric characteristic were desired in a specific instance. In certain instances the cone could also have a regular cone shape and terminate in a point at its upper end.

The lower portion 43 of the mandrel 31 is a cylinder that is collapsed at its outer or downstream end. The upstream end of the lower cylindrical portion of the cone has the same configuration and is complementary to and joined to the base of the cone. The dimensions of the cylinder 43 may be seen to change from those complementary to the base of the cone to a flattened outer edge in FIG. 1. The cylinder diminishes regularly from an enlarged spaced apart dimension at 44 where it junctures with the shaping portion 40 to a flattened edge 45 which prepares the worked tubing for drawoff through the pinch rolls 41, 42 without the necessity of the usual drawdown rollers such as are shown in U.S. Pat. No. 3,260,776 which have in the past so frequently been necessary. The particular mandrel employed had a circular configuration at 44 and was flattened at its lower extremity 45 with the change from the circular dimension to the flat dimension being a uniform uninterrupted dimensional change made in a regular cylinder having uniform dimensions. However, in particular instances it might be desirable to employ a mandrel having, for example, a ripply surface as it changed dimensions to further treat the fabric by tensioning and releasing the tension on the fabric as it was pulled across the mandrel surface. Such a ripply surface could be employed to reduce the friction that would be inherent in pulling the fabric across the mandrel surface. The frictional engagement of the plastic tubing 30 as it is drawn over the mandrel in the preferred embodiment shown in FIG. 1, first stretches the tubing to its desired dimensions and works it to produce the nonwoven fabric in cooperation with the drawing forces and then shapes or collapses the tubing to a flat shape for passage between the pinch rolls and for roll-up on the accumulation roll 50.

By my invention I also provide a new and improved method for preparing a nonwoven fabric. First, plastic material having a highly foamed cellular structure is provided. This plastic material is preferably produced by admixing a plastic material with a cell-forming agent, such as a blowing agent which has a normally gaseous state at elevated tempertures. By then heating the admixed plastic material and blowing agent in a confined zone at a temperature above the softening point of the plastic and then releasing the pressure on an admixed material a cellular structure is provided. This is done in a preferable embodiment by admixing a normally solid thermoplastic material with a blowing agent in a confined zone at a temperature above the softening point of the polymer and at elevated pressure sufficient to prevent expansion of the blowing agent and thereafter extruding the admixture through an annular die into an area of reduced pressure to form a tubular shaped cellular structure.

A highly foamed cellular plastic structure is thereby provided at a temperature above its hardening-orientation temperature. The temperature of the cellular structure is then adjusted to its hardening-orientation temperature and the cellular structure is stretched by drawing it down onto and across a shaped surface. The degrees of stretch is such at this temperature that the cellular structure of the foam is ruptured to produce a nonwoven fabric. The dimensions and frictional characteristics of the shaped surface and the rate at which the foamed plastic is drawn across the surface together with the rate of extrusion and drawn away from the extrusion die must be correlated to rupture the cells and produce the desired nonwoven fabric.

In actual practice in the preferred method the foamed plastic tube is drawn away from the die and its crosssectional dimensions expanded by the mandrel at a speed that overstretches and thins most of the cell walls rupturing the cells. The fibrils left between the cells are then further oriented and randomized longitudinally and transversely as they are drawn across the working surfaces of the mandrel.

Thus in the preferred embodiment, the plastic material is extruded as a tubular member and then drawn over a mandrel exterior of the extrusion die. The mandrel has a circumferential dimension larger than the inner crosssectional dimensions of the tube. This larger dimension serves a multifold purpose. It provides the counter force or resistance to the drawdown force to stretch the tubing laterally or transversely and also restrain the tubing so that at relatively high drawdown speeds the tubing will not be torn away from the die, distributing the drawdown forces between the mandrel's working surface and pulling the tubing away from the die. The tubing resists being pulled away from the die at a rate greater than the extrusion rate.

Drawing the tubing over a circular shaped mandrel has been found to provide a fabric of uniform characteristics throughout its dimensions. Other shapes would undoubtedly provide special characteristics and, of course, other shapes could be used which would produce substantially the same characteristics as the circular mandrel.

In order to produce a gradual transition in the diameter of the tubing the tubing is drawn down over a frustoconical cone provided at the top of the mandrel. This first or cone section of the mandrel has a planar upper tip to allow the cone to be positioned directly adjacent to the die outlet so that the tubing will naturally be at an elevated temperature and to provide for a good control of the temperature adjustment from the extrusion temperature to the hardening-orientation temperature. This close control is provided because there is only a small space between the tube leaving the die and its engagement with the mandrel. The tubing is cooled as it exits from the die by impinging cooling air on it. The shortness of the distance between the die and the mandrel provides less chance for ambient conditions to effect the tubing. Furthermore, the space required for operation of the apparatus is reduced by using the frusto-conical cone rather than a pointed cone.

The tubing is stretched to its preferred diameter and drawn to its desired extent over the mandrel. As the tubing leaves the widest extent or reaches the most extensive peripheral dimension of the mandrel the tubing is pulled over a shaped surface of the mandrel to provide its flattening into a two-ply member for drawing through pinch rollers. The pinch rollers provide the drawing force for drawing the film across the surface of the mandrel. At least one of the pinch rollers is powered. From the pinch rollers the film is accumulated on a storage roll. Of course, other means for drawing the film over the mandrel might be provided.

Surprisingly, it has been found that as the speed of draw is reduced the web becomes coarser and less fibrous. Of course, to reduce the withdrawal rate beyond a given point for any material will cause the material to return wholly to the foamed sheet or tube from which it originated. With a material such as polypropylene it has been found that a drawdown of less than 5 feet per minute across a mandrel produces a relatively coarse and uneven nonwoven fabric having large open areas as may be seen, for example, in Sample 3 when the mandrel is at least two times larger in diameter than the extruded tube. Preferably, the mandrel should be from 2 to 4 times greater in circumferential or peripheral dimension than the extruded tube. And the draw rate should preferably be 20 to 300 feet per minute. In some instances even a higher draw rate may be desirable. It has been observed that the higher the speed of the draw the finer will be the foam for a given mandrel size. Of course, there is a point at which there is natural parting of the fabric because of the excessive thinning out of the nonwoven fabric to such an extent that its tensile strength is no longer sufficient to hold it together. For a fine pored fabric a high speed over a large mandrel is preferable up to the point where the fabric becomes so thin as to actually no longer have tensile strength sufficient to hold it together. The finer pored fabric is generally the more desirable fabric.

It has also been discovered that in general for materials such as polypropylene the lower the viscosity of the extruded material and the higher the viscosity of the material at the time of orientation the better and more uniform is the structure of the nonwoven fabric. In other words and within tensile strength limits, the higher the melt index of the material the more uniform will be the web of nonwoven fabric. It is generally necessary to cool the tubular extrudate rapidly before any great amount of stretching or pulling occurs so that the tubing can be further increased in viscosity which is necessary for high orientation. Polypropylene characteristically has high tensile strength when oriented. This and other high tensile strength polymers are therefore better suited for fiber formation than those with lower tensile strength. The presence of foreign agents which may induce recrystallization at a more rapid rate in general produce a less uniform web. Materials with slow recrystallization rates produce more uniform fibrous webs. It is generally preferable that the material remain as soft as possible while it is being cooled and oriented. The cooling range for the mandrel may be below the hardening temperature of the polymer but certainly not above it.

Turning now to the non-woven fabric of my invention, this fabric consists of one continuous extruded sheet of plastic having continuous branching fibril structure across the length and width with characterizing fibril orientation, both longitudinally and transverse of the fabric. The fabric also has at least 25% shrink in both directions when subject to high temperature conditions sufficient to relax the orientation. Preferably, the longitudinal shrink is at least 50%. The fabric has many openings or interstices and may be coarse or fine and sheer.

It is believed that my invention operates in theory on the basis of the following physical principles; I, however, do not intend to be bound by this explanation of operation which is given with the intent that even though it is only theory it will aid in more thoroughly understanding the invention. As the extrudate is extruded and foams the cell walls acquire a higher state of orientation than the polymer between the cell walls. The cell walls are also not as thick as the material between the cells and therefore the cell walls cool more rapidly than the material between the cells. Thus as the extruded tubing is pulled away from the die the thin more highly oriented and cooled cell walls exceed their tensile strength and rupture. At the time of rupture the cell walls have probably passed wholly below their hardening point. The material between the cells is still above the hardening point. These thicker areas continue to elongate and thin in response to the pulldown force while the material is subjected to the cooling environment. The work of elongation produces heat which helps to maintain the thicker areas above their hardening point while the cell walls are being ruptured.

In my copending application, U.S. Ser. No. 351,751, now Pat. No. 3,403,203, the following described apparatus and methods were described. The apparatus is further schematically illustrated in the drawings FIGS. 2 and 3 and the method in Examples 9 and 10, which drawings and examples also appear in U.S. Ser. No. 351,751, now Pat. No. 3,403,203. The nonwoven fabric produced in the manner described in said copending application constitutes part of the subject matter of this application.

Figures 2, 3:
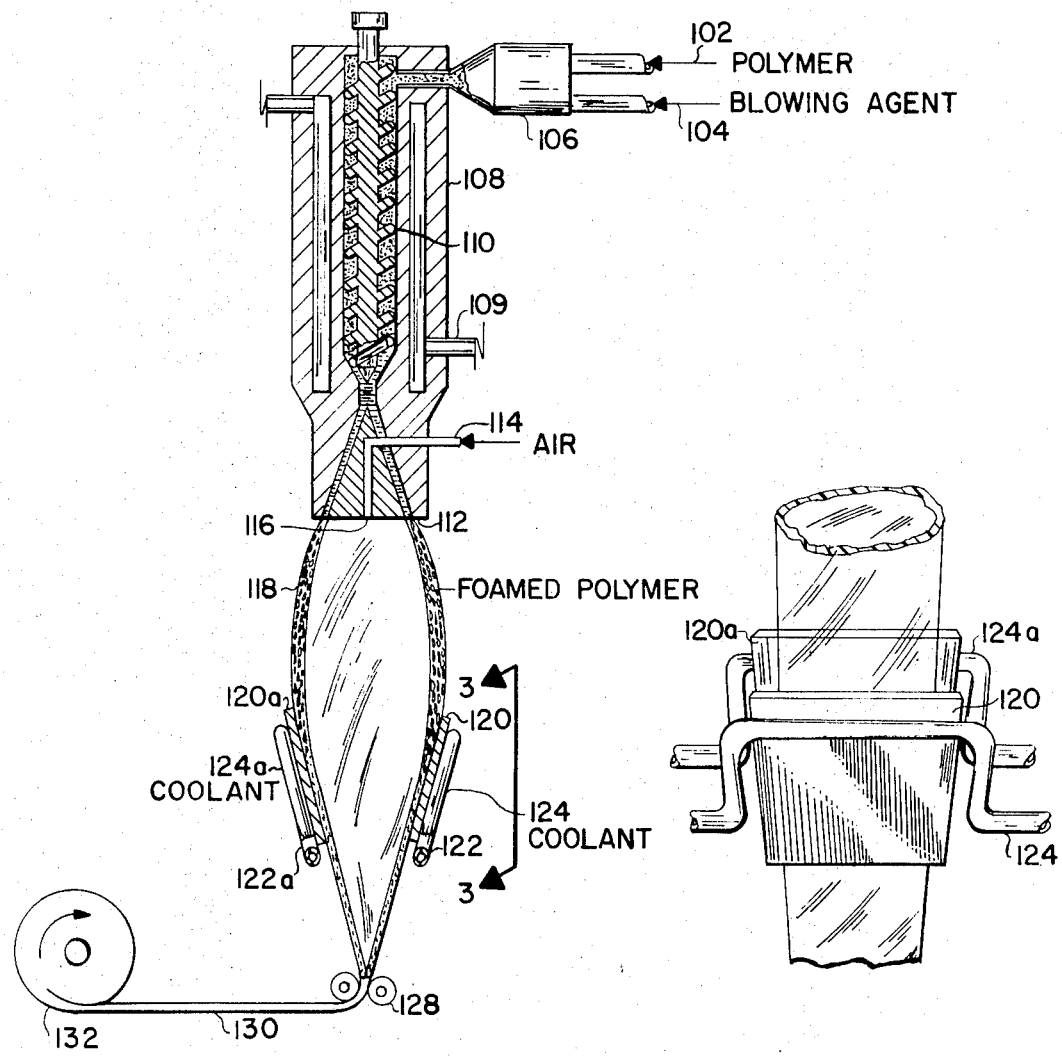
FIG. 2 is a schematic diagram showing the extruding of the thermoplastic and orientation and rupture of the foamed polymer by inflation.
FIG. 3 is a view 3—3 of the cooling coils and baffle members of FIG. 2.

FIG. 2 is a schematic diagram illustrating one embodiment for preparing the highly porous nonwoven fabric-like materials of this invention. The polymer and blowing agent are fed through conduits 102 and 104, respectively, along with any other additives such as anti-oxidants, etc., into a feed hopper 106 to a conventional extruder 108. The polymer and blowing agent may be premixed if desired. Any suitable type of extruder can be employed which elevates the temperature of the admixture to above the softening point or plasticizing point of the polymer and provides sufficient working to homogenize the mixture. The mixture is worked and propelled by a screw means 110 toward the discharge end of the extruder and through an annular die 112. A fluid, such as air, is fed through conduit 114 under pressure through a passageway 116 interiorly of the annular die 112. The extruder is cooled by any suitable means such as a cooling fluid passed through an internal jacket 109. The molten polymer under pressure is forced through the die 112 into an area of reduced pressure, normally atmospheric, and immediately begins to expand to foam due to the release of pressure on the gaseous material formed from the blowing agent. The air pressure through conduit 116 is adjusted so as to inflate the expanding polymer 118 resulting in biaxial orientation of the individual cells. However, as the cells begin to cool and solidify, the continued inflating results in the breaking or rupturing of the individual cells. It has been found that by controlling the amount of inflation and cooling that a substantial portion of the cells may be ruptured to produce a highly porous nonwoven elongated fabriclike member.

In a preferred embodiment, the inflated tube or bubble is pulled by pinch rolls 128 after cooling by means of spaced, interiorly cooled, collapsing tubes 122 and 122a. A coolant is circulated through coils 124 and 124a respectively. Preferably, these cooling tubes cover a substantial portion of the external surface of the inflated tube to provide cooling rapidly after expansion of the polymer. FIG. 3 is another view, along lines 3—3 of FIG. 2, of the baffles and cooling tubes.

It has also been found that the provision of baffle plates or backing members 120 and 120a, which may be secured to the inside of the cooling tubes, assist greatly in preventing or restricting excessive air loss through the openings in the inflated tube caused by rupturing of the cells. This aids in maintaining a high pressure differential between the outside and inside of the extruded tube and results in greater inflation and more uniform pores and a higher degree of rupturing of the pores. Preferably, the baffle plates cover a substantial portion of the external surface area of the inflated tubing and diverge toward the die as shown in FIG. 2. However, any suitable means may be provided for restricting the loss of air from the interior of the inflated tube. The deflated tube 130 in FIG. 2 is then rolled up on any suitable means 132 for subsequent usage. If desired, the tube may be slit to form a sheet or be otherwise processed (not shown).

In performing the method of the invention of this application it is only necessary to form or extrude the gel mixture at temperatures and/or pressures sufficient to cause substantially complete foaming of the selected foamable composition as it issues from the die orifice, and while the extruded tube is still hot to stretch it sufficiently to burst at least a major proportion of the individual cells in the foam as extruded.

Substantially complete foaming can be accomplished by use of very high extrusion temperatures or, if there is any concern about polymer degradation, by incorporating in the foamable composition a substance to activate or speed up the release of the foaming gas at lower temperatures. Suitable foaming activators for various foaming agents are known to those skilled in the art. Exemplary materials are various metal soaps and metal oxides, e.g., lead stearate, zinc stearate, titanium dioxide, silica, etc.

The invention is applicable to a wide variety of foamable compositions including, but not limited to, foamable compositions of polyvinylchloride, polystyrene, polyurethanes, cellulose acetate polymers, polyamides, polycarbonates and numerous polyolefins such as polyethylene (either high, medium or low density made by high or low pressure processes), polypropylene, poly (butene-1), poly (hexene-1), ethylene-propylene co-polymers, ethylene-butene copolymers and many other like materials.

The foamable compositions may contain any suitable type of blowing or foaming agent which will produce, or cause to be produced, a normally gaseous material at the conditions of extrusion including chemically or physically decomposable blowing agents. Exemplary chemical foaming agents include, but are not limited to, azobisformamide (also known as azobicarbonamide), azobisisobutyronitrile, diazoaminobenzene, 4,4'-oxybis (benzenesulfonylhydrazide), benzenesulfonylhydrazide, N,N'-dinitrosopentamethylenetetramine, trihydrozino-symtriazine, p,p'-oxybis (benzene-sulfonylsemicarbazide), barium azodicarboxylate, sodium borohydride and other like materials. Physical foaming agents include, but are not limited to, low boiling liquid hydrocarbons, e.g., hexane, pentane, heptane, petroleum ether, etc.; various fluorocarbons, e.g., dichlorodifluoromethane, trichlorofluoromethane, 1,2-dichlorotetrafluorethane, etc., and other like materials.

The foamable composition, per se, is not a part of the present invention. Various commercially available foamable compositions can suitably be used. If desired the foamable composition can be prepared and extruded in accordance with the invention in one continuous operation. The particular synthetic organic thermoplastic polymer and the particular foaming agent to be used in the process depends primarily upon the properties desired in the final product. The temperatures and pressures employed for the mixing, extruding, and foaming operations are also well known. In general, the thermoplastic and blowing agent are intimately admixed, elevated in temperature to above the softening point of the thermoplastic and above the temperature at which the gaseous blowing agent is formed under elevated pressure, and expanded at atmospheric pressure.

Practice of the invention is further illustrated by the following specific examples. All parts are parts by weight.

EXAMPLE 1

A substantially homogeneous foamable composition was prepared by dry mixing the following materials for about 15 minutes in a commercially available tumbler blender:

Resin—99 parts by weight of polypropylene of 4 melt flow (Shell 5520 polypropylene, obtained from Shell Chemical Company)

Blowing agent—1 part by weight of azobisformamide (Celogen AZ™ obtained from Naugatuck Chemical Co.)

The admixed materials were then extruded in a standard polyethylene type extruder which was a 1½ inch 24:1 Dilts Extruder having a die with a 3½ inch crosshead with a 100 mil gap. The extruder barrel was heated as follows:

|  | ° F. |
|---|---|
| Rear zone | 400 |
| Middle zone | 460 |
| Forward zone | 470 |

The die was heated to 470° F. The screw speed was 15 r.p.m. driven by a 7½ horsepower motor at 17 amps, 25 volts. The pressure was 1400 p.s.i. and the extrusion rate was 26.6 grams per minute.

The mandrel was a hollow sheet aluminum air cooled structure illustrated in FIGS. 1 and 1A with the lower portion formed from a cylinder having a 10 inch diameter. The cylinder was flattened at its lower extremity and circular at its upper extremity with a uniform uninterrupted dimensional change therebetween. The top portion of the mandrel is a frusto-conical cone having a plane at its apex which is circular and has a diameter of 3 inches. The cone's base diameter is 10 inches and its height is 2 inches with uniform uninterrupted sides in between. The total height of the mandrel is 20 inches. The mandrel was centered below the die with the apex of the frusto-conical cone about ½ inch below the die head. The extrudate engaged the surface of the mandrel about 1 inch above the juncture of the cone and the cylinder. The mandrel was air cooled and the temperature was maintained substantially constant at 24° C. during operation by cooling air supplied to the inside surfaces of the mandrel as illustrated in FIG. 1.

A cooling ring was provided, as illustrated in FIG. 1, surrounding the die just below the die outlet. The cooling ring had a continuous air gap at the upper edge of its inside wall of about 1/16 inch. The cooling ring's inside diameter was 5 inches and the air outlet was almost on level with the die so that the air impinged on the extruded tubing at its exit from the die lips. Ordinary compressed air under ambient conditions of about 70° F. was supplied at 90 p.s.i. to the air ring.

Pinch rolls were provided below the mandrel and these drew the extrudate away from the die and over the surface of the mandrel. The pinch rolls had variable speed characteristics. A windup roll was provided beyond the pinch rolls for winding up the processed material. The tubular nonwoven fabric was not slit.

Figure 4:
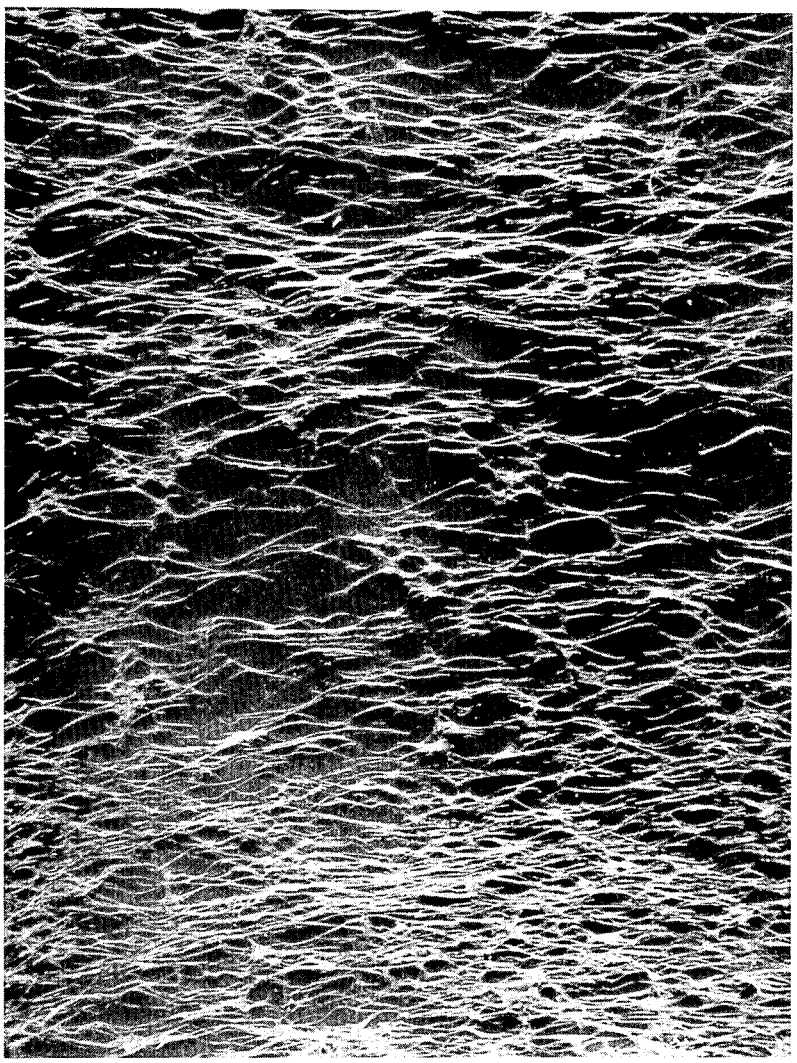
FIG. 4 is a photomicrograph of a portion of the fabric Sample 1 of Example 1.
Figure 5:
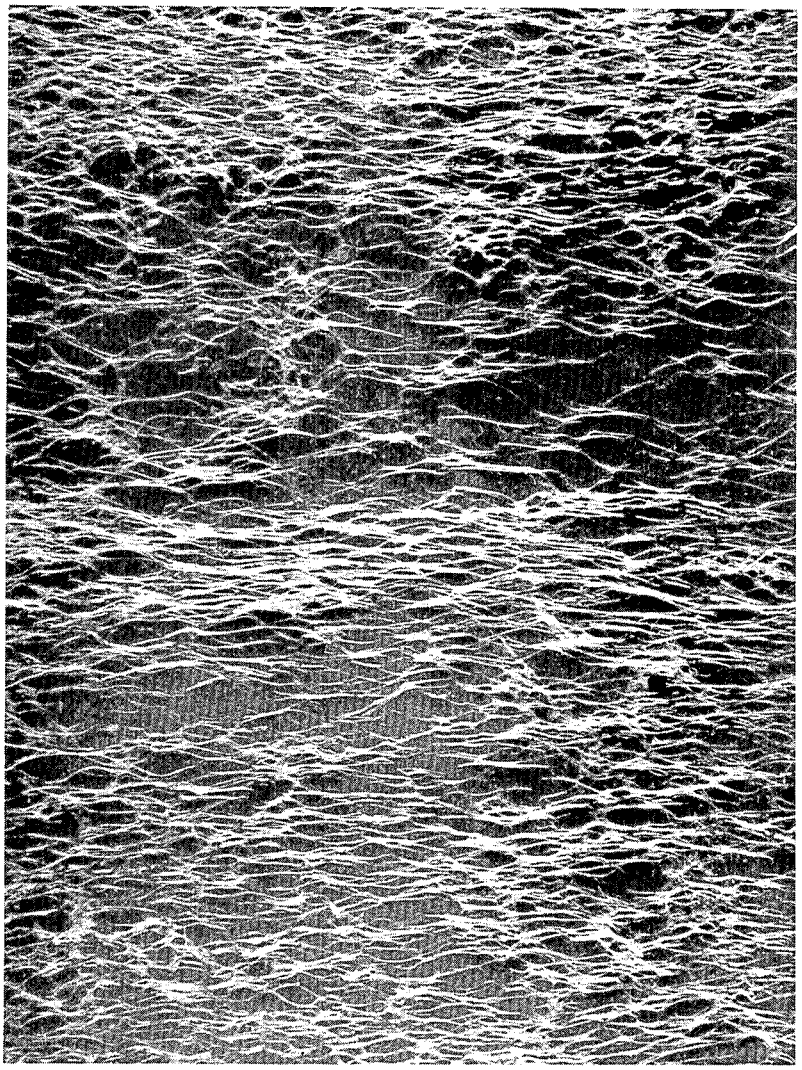
FIG. 5 is a photomicrograph of a portion of the fabric Sample 2 of Example 1.
Figure 6:
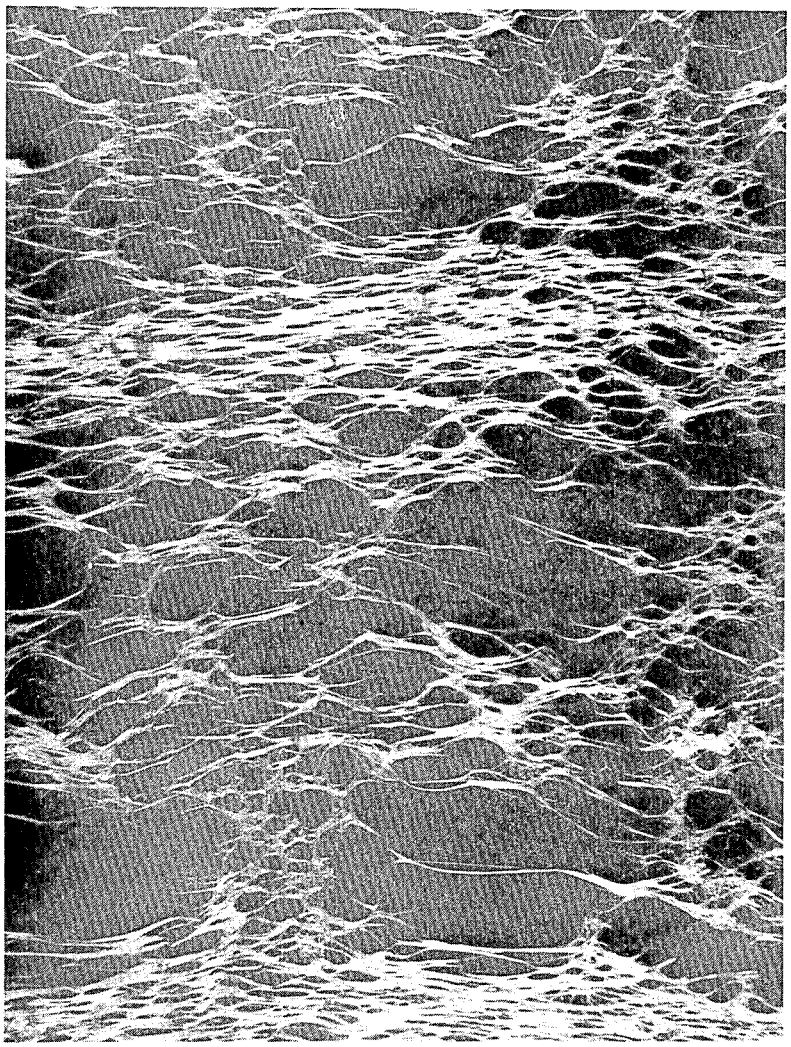
FIG. 6 is a photomicrograph of a portion of the fabric Sample 3 of Example 1.

In operation for the procedures of Example 1 three samples were made varying only in the speed of drawdown by the pinch rolls which were 15.5 feet per minute for Sample 1 which is shown in FIG. 4; 11.5 feet per minute for Sample 2, which is shown in FIG. 5; and 5.0 feet per minute for Sample 3, which is shown in FIG. 6.

The conclusion drawn from this procedure was that as the draw speed is reduced the web of nonwoven fabric becomes coarser and less fibrous, ultimately the web would approach the foamed extrudate from which it originated.

EXAMPLE 2

The procedure of Example 1 was repeated except the air cooling ring was shut off. This caused the web formation to break.

The conclusion drawn from this procedure was that a rapid cooling of the extrudate during the drawing step was essential under the conditions and using the plastic materials employed.

EXAMPLE 3

The procedure of Example 2 was repeated except 1.5 parts by weight of a thickener, a fire dry pyrogenic silica with a surface area of 200 sq. meters per gram (Cab-O-Sil obtained from Cabot Corp.) was added to the composition at the beginning of the dry mixing and the amount of resin was reduced to 97.5 parts. The extruder barrel was heated as follows:

| | °F. |
|---|---|
| Rear zone | 420 |
| Middle zone | 500 |
| Forward zone | 500 |
| Die | 520 |

Figure 7:
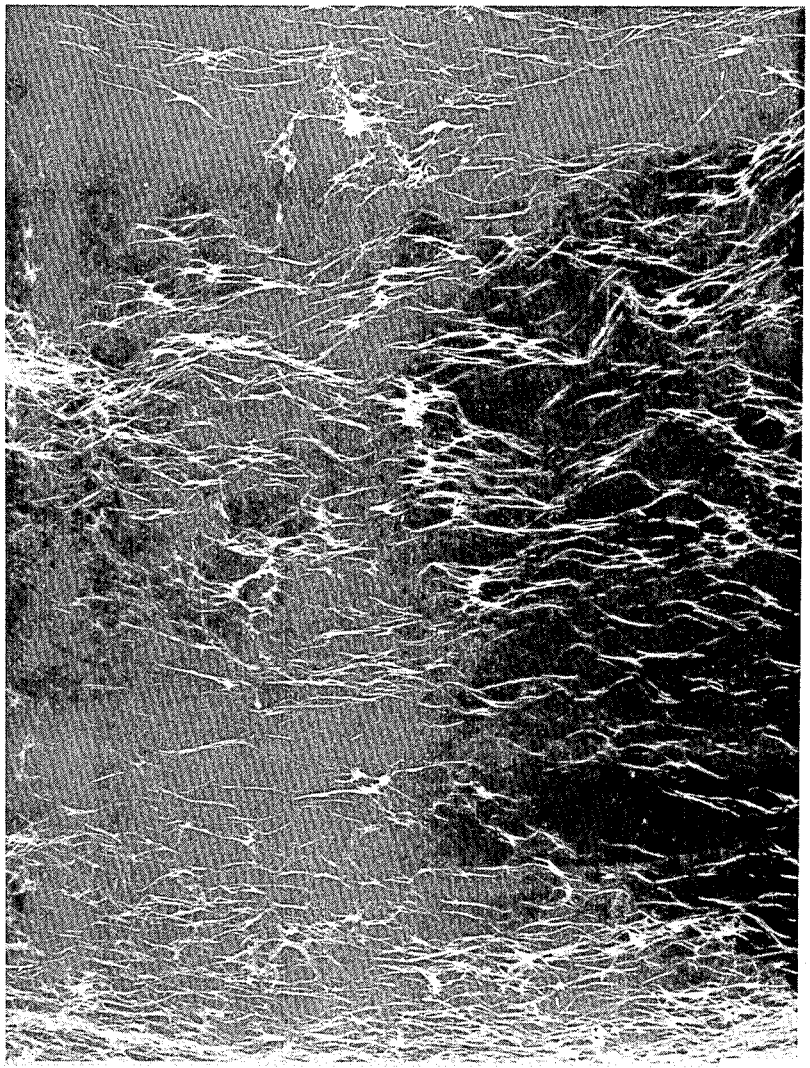
FIG. 7 is a photomicrograph of a portion of the fabric Sample 4 of Example 3.
Figure 8:
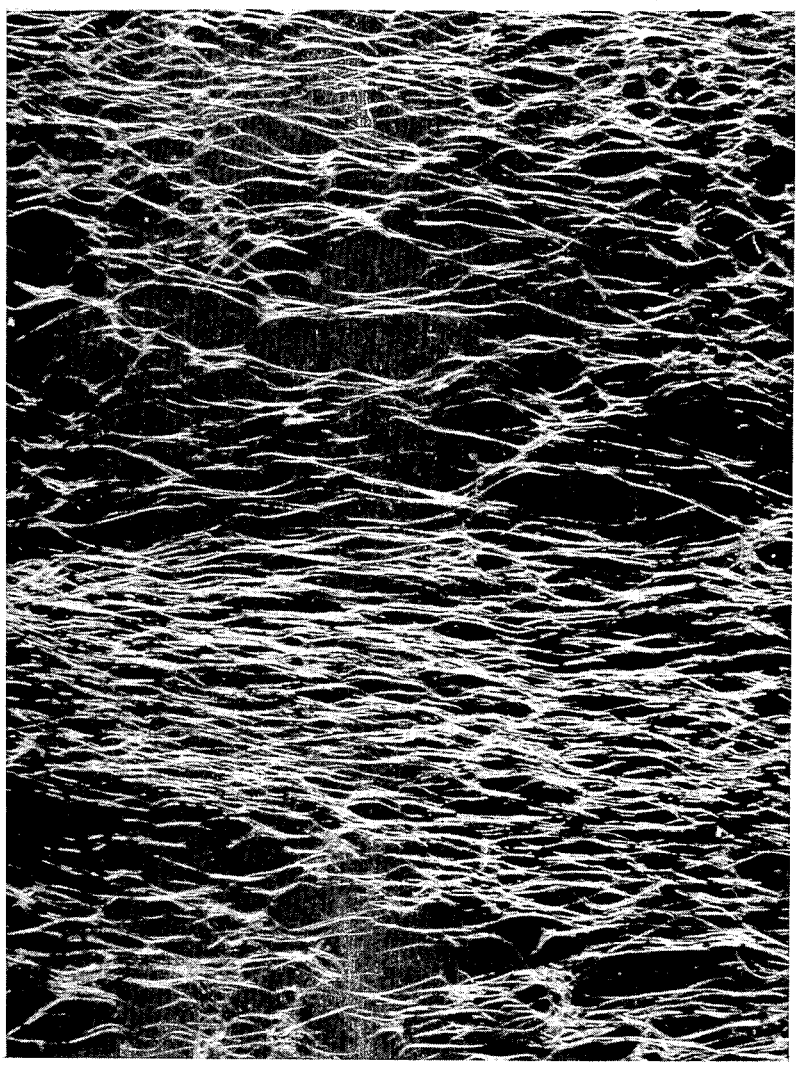
FIG. 8 is a photomicrograph of a portion of the fabric Sample 5 of Example 3.

Two samples were prepared using different drawdown speeds. Sample 4, which is shown in FIG. 7 was drawn at 18.3 feet per minute. Sample 5, which is shown in FIG. 8, was drawn at 9.9 feet per minute.

The conclusion drawn from this procedure was that finely divided particles within the foamed polymer resulted in a less uniform web.

EXAMPLE 4

Figure 9:
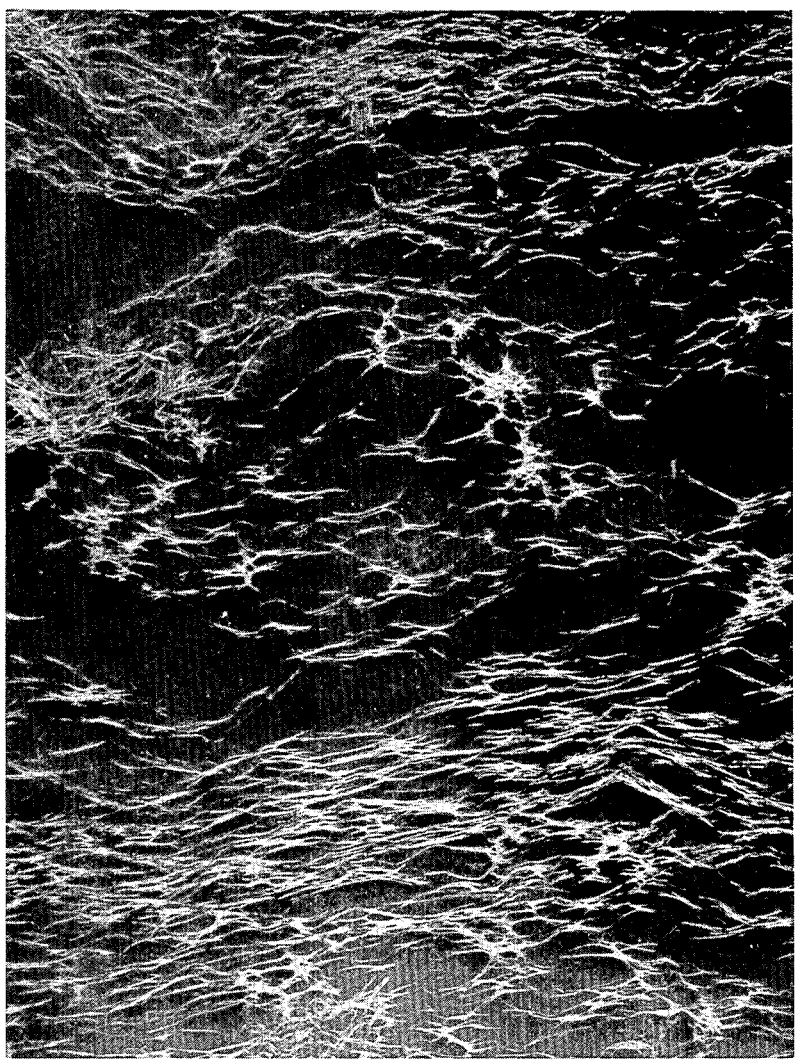
FIG. 9 is a photomicrograph of a portion of the fabric Sample 6 of Example 4.

The procedure of Example 1 was repeated except the resin used was polypropylene of .7 melt flow (Shell 5220 polypropylene). One sample was prepared, at a drawdown speed of 18.8 feet per minute. This is Sample 6, which is shown in FIG. 9. The extruder barrel was heated as follows:

| | °F. |
|---|---|
| Rear zone | 420 |
| Middle zone | 500 |
| Forward zone | 500 |
| Die | 520 |

The conclusion drawn from this procedure was that high viscosity polypropylene was a relatively poor resin material for use in this process as compared to low viscosity polypropylene which produced a nonwoven fabric with smaller openings and more fibrils.

EXAMPLE 5

The procedure of Example 1 was repeated except the resin was polystyrene 150 sold by W. R. Grace & Co. The motor was driven at 16 amps, 25 volts and the pressure was 1300 p.s.i., and the extrusion rate 42 grams per minute. The extruder barrel was heated as follows:

| | °F. |
|---|---|
| Rear zone | 420 |
| Middle zone | 500 |
| Forward zone | 500 |
| Die | 520 |

It was found that fibers could not be drawn out when the extruder was operated at a slower extrusion rate under the existing operating conditions.

Figure 10:
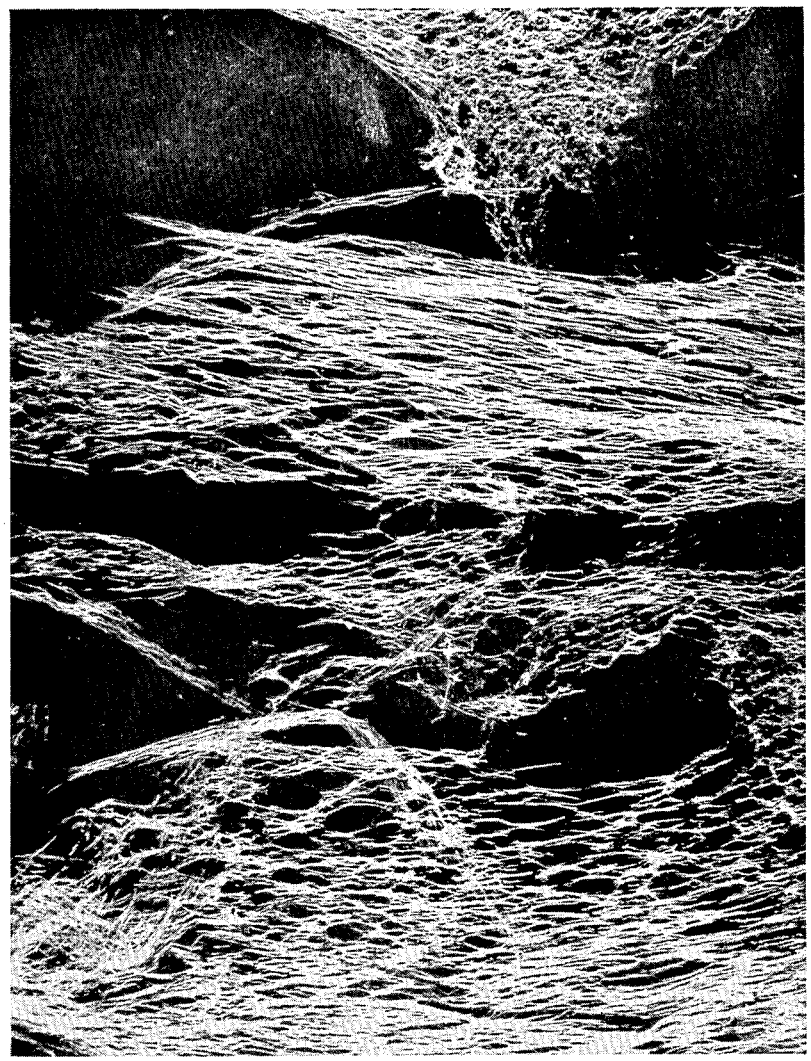
FIG. 10 is a photomicrograph of a portion of the fabric Sample 7 of Example 5.

The rate of draw employed was 18.8 feet per minute and the Sample 7 produced is shown in FIG. 10.

The conclusion drawn from this procedure was that polystyrene was relatively more difficult to form into a web than polypropylene using this process and the attendant operating conditions. Only a discontinuous web was formed because the material could not be stretched as much transversely as the polypropylene. A smaller diameter mandrel would be required if a continuous web was to be formed using the procedure and conditions described.

EXAMPLE 6

The procedure of Example 1 was repeated except the resin was a high melt index polypropylene, 15 melt flow (Shell 5824). The extruder motor was operated at 16 amps, 35 volts, the screw was operated at 25 r.p.m., and the pressure was 1400 p.s.i. The extrusion rate was 40.5 grams per minute. The extruder barrel was heated as follows:

| | °F. |
|---|---|
| Rear zone | 400 |
| Middle zone | 440 |
| Forward zone | 440 |
| Die | 490 |

Figure 11:
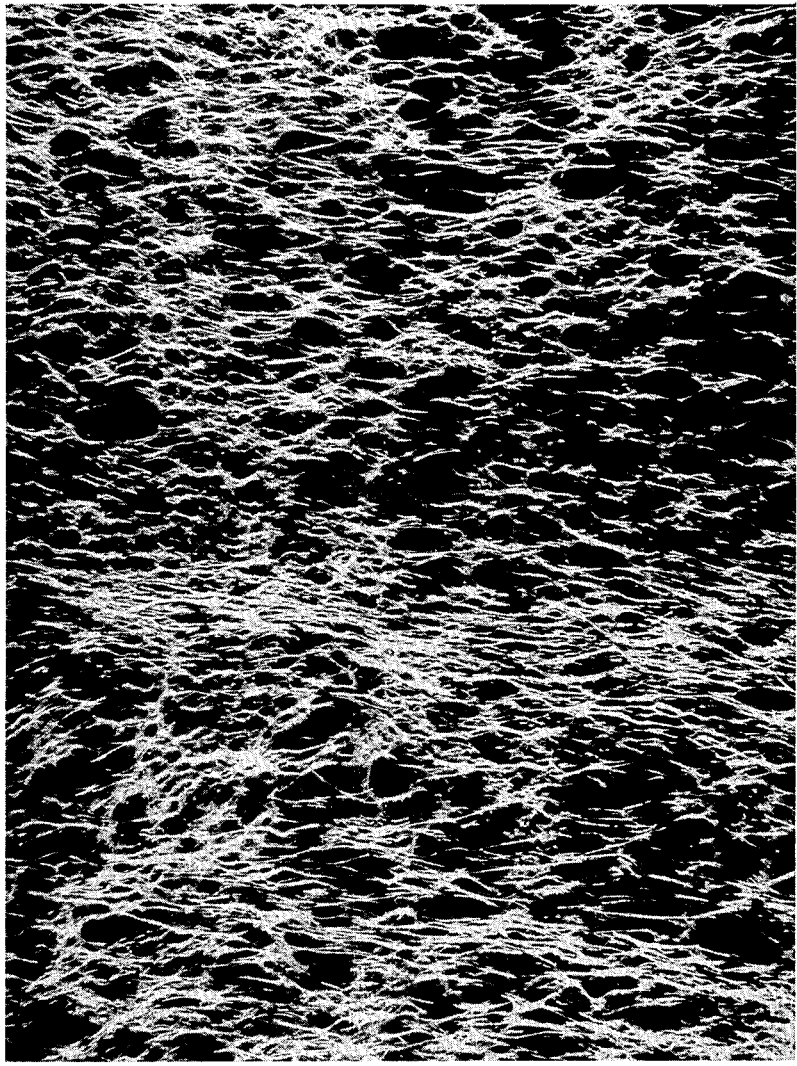
FIG. 11 is a photomicrograph of a portion of the fabric Sample 8 of Example 6.

The rate of draw employed was 17.2 feet per minute and the Sample 8 produced is shown in FIG. 11.

The conclusion drawn from this procedure was that the high melt index polypropylene produced a relatively superior web having smaller interstices and finer fibers.

EXAMPLE 7

The procedure of Example 1 was repeated except the resin was polypropylene of 4 melt flow obtained from a different source (Profax 6420 obtained from Hercules Chemical Co.). The blowing agent in Sample 9 was 1 part by weight and in Sample 10 was 2 parts by weight. Three parts by weight was used but the web formation was very poor and no sample was retained. The extruder barrel was heated as follows:

| | °F. |
|---|---|
| Rear zone | 405 |
| Middle zone | 440 |
| Forward zone | 440 |
| Die | 490 |

The screw speed was 45 r.p.m. The motor was operated at 17.5 amps, 55 volts.

The pressure was not recorded and the extrusion rate was 89.5 grams per minute.

Figure 12:
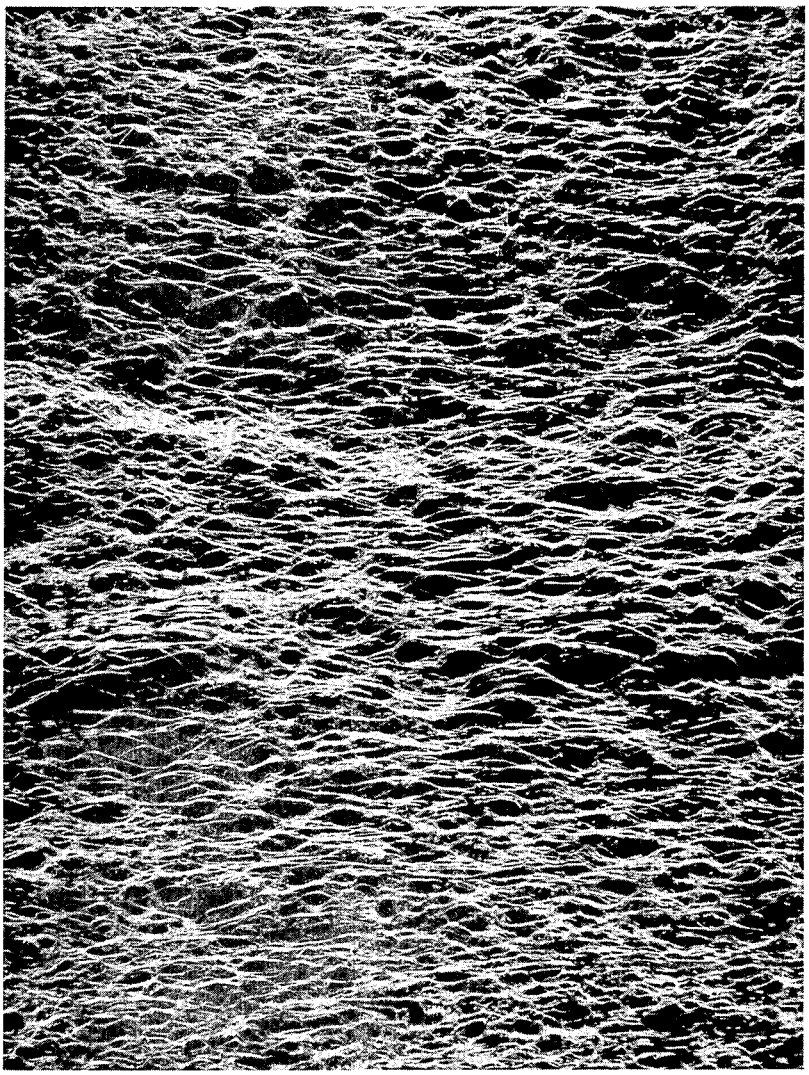
FIG. 12 is a photomicrograph of a portion of the fabric Sample 9 of Example 7.
Figure 13:
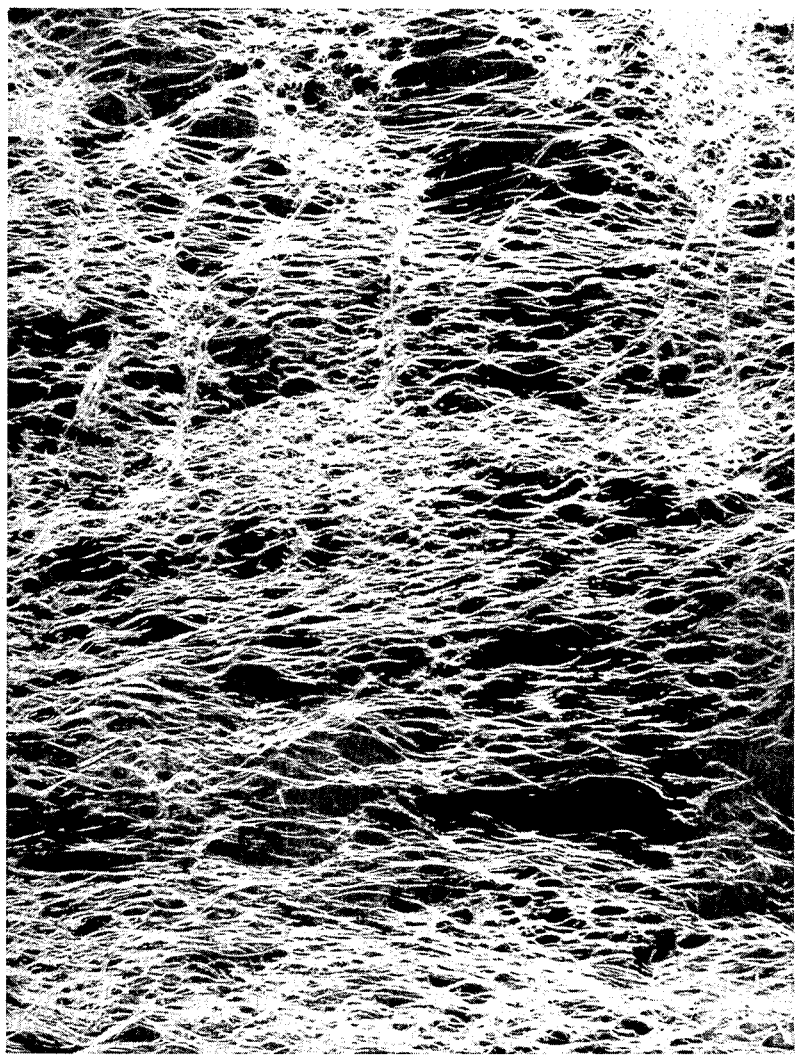
FIG. 13 is a photomicrograph of a portion of the fabric Sample 10 of Example 7.
Figure 14:
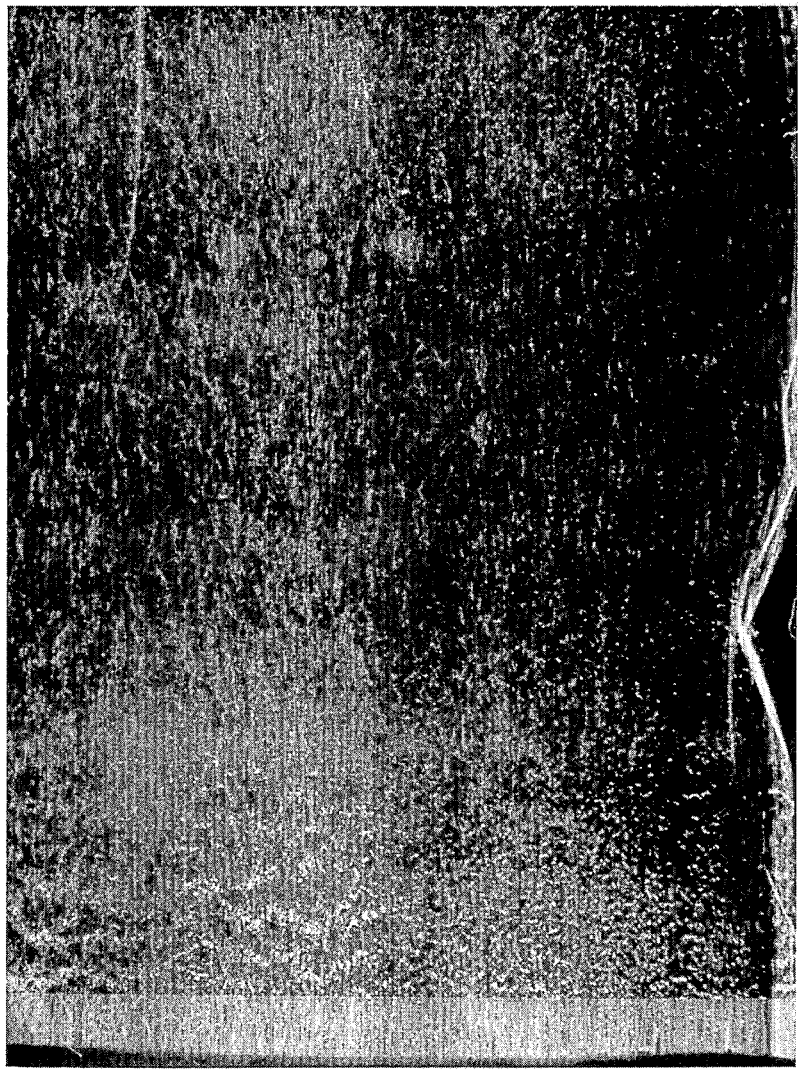
FIG. 14 is a photomicrograph of a portion of the fabric Sample 11 of Example 8.

The rate of draw employed was 18.4 feet per minute. Sample 9 is shown in FIG. 12 and Sample 10 in FIG. 13.

The conclusion drawn from this procedure was that an azobisformamide blowing agent content below 1% yields a relatively better quality nonwoven fabric than an azobisformamide blowing agent content above 1% employing the procedure and conditions described.

EXAMPLE 8

The procedure of Example 1 was repeated except the resin was reduced to 97 parts and was polybutene-1 (BB18 obtained from Mobil Chemical). Three parts of the blowing agent were used. The extruder barrel was heated as follows:

| | °F. |
|---|---|
| Rear zone | 400 |
| Forward zone | 400 |

The die was heated to 350° F.

A smaller mandrel, measuring 7 inches at the cone's base was used. The mandrel had the same configuration as in Example 1.

The conclusion drawn from this procedure was that the material produced showed an extremely fine fibrous structure. Polybutene-1 has relatively slow recrystallization rates compared to polypropylene.

EXAMPLE 9

A substantially homogeneous foamable composition was prepared by dry mixing the following materials for about 15 minutes in a commercially available tumble blender:

| | Parts |
|---|---|
| Powdered polypropylene resin (Profax) | 1000 |
| Azobisformamide (Celogen AZ) | 30 |
| Zinc stearate | 10 |

The zinc stearate is a lower temperature decomposition activator for the azobisformamide.

The admixed materials were then extruded in a standard polyethylene-type extruder having a 1½ inch screw and a length to diameter ratio of 20 to 1. The rear and front sections of the extruder barrel were heated to 400° and 415° F., respectively.

The die temperature was maintained at 425° F. The die was a standard tubular die having 1 inch diameter orifice opening, the annular width of which was .030 inch (30 mils).

Rotation of the extruder screw at 34 revolutions per minute caused production of tubing at about 12.5 feet per minute. The tubing was extruded between a pair of baffle plates as illustrated in FIGS. 2 and 3 of the drawings. Pressurized air (30 p.s.i.) was introduced through a pipe in the die mandrel into the interior of the tube. This expanded the tubing to a diameter of 2 inches and a wall thickness of about .010 inch (10 mils). Practically all of the cells in the foamed polypropylene tube were burst by this expansion.

Figure 15:
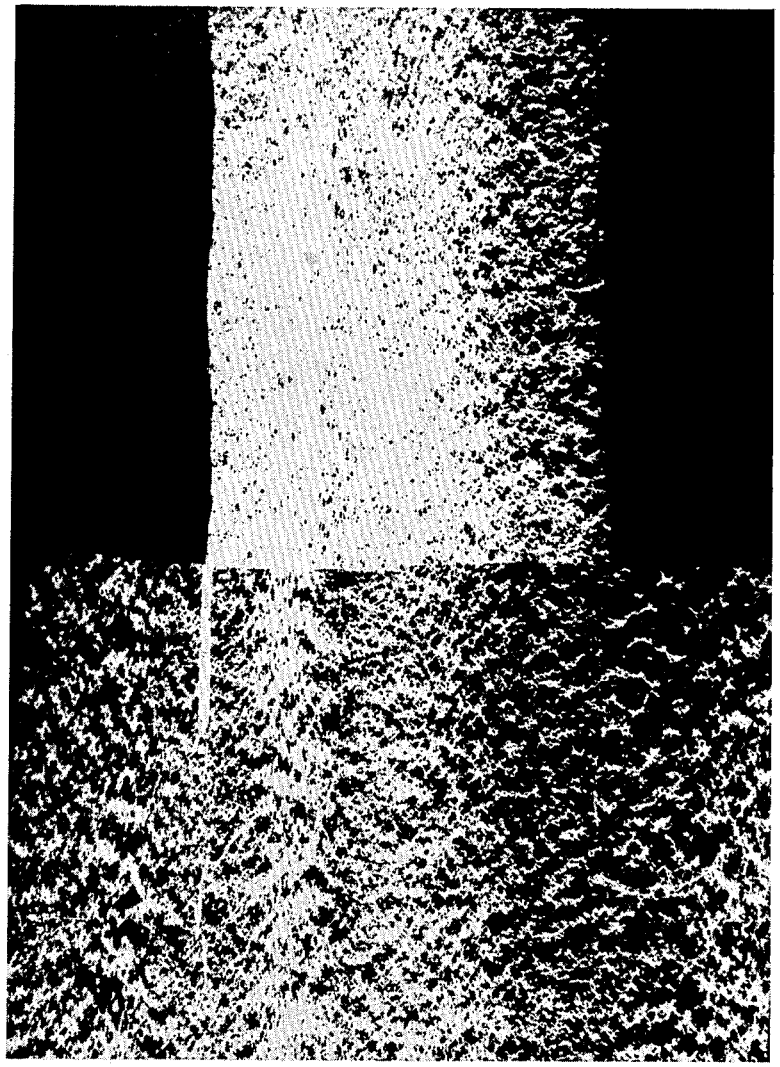
FIG. 15 is a photomicrograph of a portion of the fabric Sample 12 of Example 9; and, FIG. 16 is an enlargement of the photomicrograph shown in FIG. 15.
Figure 16:
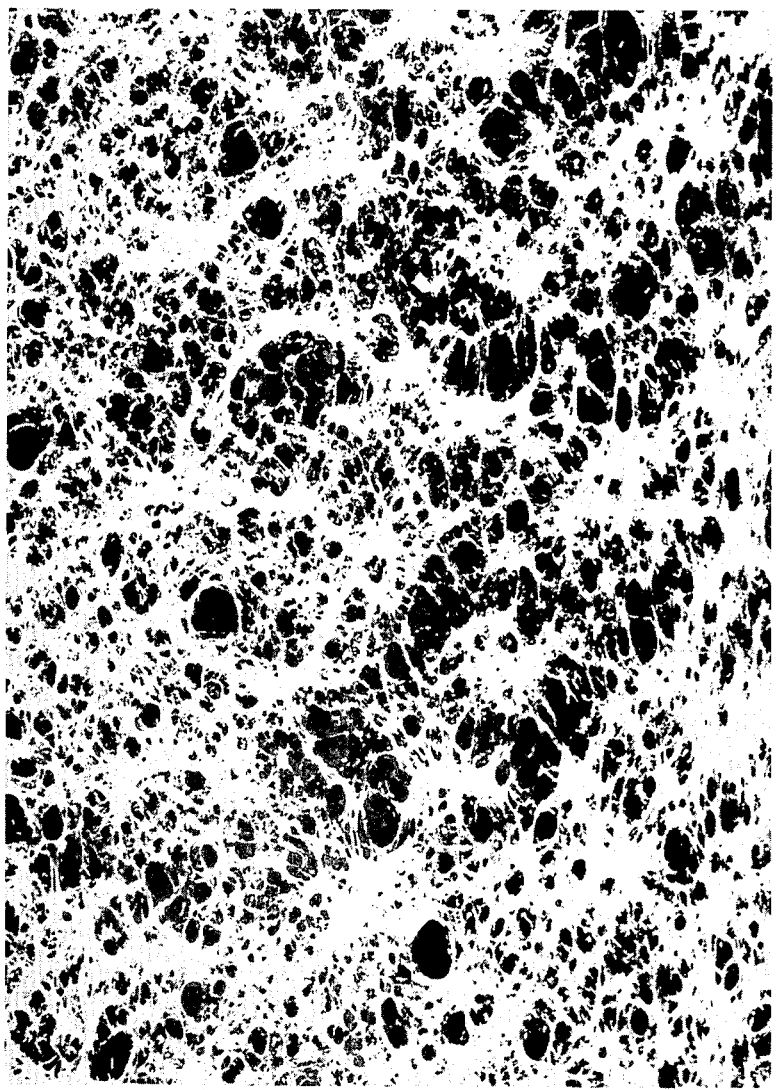

The product made in accordance with this example is shown in FIG. 15. The upper portion of the photograph shows the tubing lying flat with the lower portion showing the tubing after it had been slit to form a fabric. The photomicrograph of FIG. 16 is a fivefold magnification of the product shown in FIG. 15. The porous nonwoven fabriclike design is readily apparent from these photographs.

EXAMPLE 10

In this example a substantially homogeneous dry blend was prepared in exactly the same manner described in Example 9. The admixture contained the same materials in the same proportions except for the substitution of commercially available high density ethylene-butene copolymer ("Grex," W. R. Grace & Co.,—.950 gm./cc. density) for the polypropylene.

The extrusion set-up was the same as that described in Example 9. Barrel temperatures were maintained at 375° F. in both sections and the die was maintained at 375° F. The screw speed was 28 revolutions per minute, resulting in a tube production rate of about 7.5 feet per minute.

The foam tube was rapidly expanded to an external diameter of 2 inches and a wall thickness of about .010 inch (10 mils). A porous nonwoven fabriclike member was the result.

While certain examples, structures, composition and process steps have been described for purposes of illustration, the invention is not limited to these. Variation and modification within the scope of the disclosure and the claims can readily be effected by those skilled in the art.

I claim:
1. A method for preparing a nonwoven fabric comprising:
   (a) forming a substantially continuous plastic sheet with a cellular structure,
   (b) adjusting the temperature of said sheet of plastic to its hardening-orientation temperature,
   (c) drawing said temperature conditioned sheet of plastic over a shaped surface at the rate of at least 5 feet per minute,
   (d) extending said plastic sheet at least about 2 times its width by engagement of said sheet with said shaped surface as said sheet is drawn thereover,
   (e) exerting a force counter to the drawdown force by said shaped surface,
   (f) stretching the cell walls of said cellular structure until they rupture, and
   (g) producing a nonwoven fabric.

2. The method of claim 1 wherein said plastic sheet is formed by extruding a plastic tube, said plastic tubular sheet is then brought to its hardening/orientation temperature by cooling said plastic sheet directly from its extrusion temperature, and said plastic tubular sheet is drawn over a shaped surface that is a mandrel having greater perimeter dimension than the internal cross-sectional perimeter of the plastic tubular member and a generally conical end pointing upstream to stretch the cell walls of said cellular structure until they rupture producing a nonwoven fabric, the outermost perimeter dimension of said mandrel and the speed of drawing the plastic tubular sheet over said mandrel being correlated to rupture the cells of said plastic tubular sheet to produce the nonwoven fabric.

3. The method of claim 2 wherein said plastic tubular sheet is cooled by impinging fluid against the tubular sheet at substantially the area where it exits from the extrusion die and wherein the plastic tubular sheet is drawn over a frusto-conical mandrel head positioned closely adjacent to the extrusion die.

4. The method of claim 3 wherein said plastic tubular sheet is further cooled by engagement with the mandrel and the mandrel is provided with internal cooling and wherein the plastic tubular sheet is drawn downstream from said die and over said mandrel by a pair of pinch rolls downstream from said mandrel, said plastic tubular sheet being stretched by a frusto-conical mandrel head that is circular at its base and then collapsed by a cylindrical mandrel portion downstream from said base which has a flattened edge at its downstream extremity with its outer periphery being a substantially uniform uninterrupted dimensional change evenly guiding the fully stretched plastic tubular sheet in taut condition to collapsed condition and directly feeding the collapsed plastic tubular sheet into the bite of the pinch rolls.

5. A method of claim 4 wherein said extruded plastic tube is formed by first admixing a normally solid thermoplastic polymeric material and a blowing agent which produces a normally gaseous material at elevated temperature; heating said admixture in a confined zone at a temperature above the softening point of said polymer and at an elevated pressure sufficient to prevent expansion of the blowing agent gas; extruding said admixture through an annular die into an area of reduced pressure to form the tubular shaped cellular structure.

References Cited

UNITED STATES PATENTS

| | | | |
|---|---|---|---|
| 2,337,927 | 12/1943 | Reichel et al. | |
| 2,987,767 | 6/1961 | Berry et al. | 264—95 |
| 3,108,324 | 10/1963 | Zavasnik | 264—210 XR |
| 3,248,462 | 4/1966 | Merrill et al. | 264—53 |
| 3,391,051 | 7/1968 | Ehrenfreund et al. | 264—53 XR |
| 3,403,203 | 9/1968 | Schirmer | 264—321 XR |
| 3,426,111 | 2/1969 | Simpson | 264—51 XR |
| 3,085,293 | 4/1963 | Kritchever | 264—210 |
| 3,197,538 | 7/1965 | Capron et al. | 264—210 XR |
| 3,254,146 | 5/1966 | Quinn | 264—210 |
| 3,271,495 | 9/1966 | Gronholz et al. | 264—210 |

FOREIGN PATENTS 153,610   10/1953   Australia.

OTHER REFERENCES

Boundy, Ray H., Ed.: Styrene: Its Polymers, Copolymers and Derivatives. New York, Reinhold, 1952, pp. 529, 570, 1150, 1151, 1240.

Tordella, J. P.: "Fracture in Extrusion of Amorphous (Other references on following page)

Polymers Through Capillaries," In Journal of Applied Physics, vol. 27, No. 5, May 1956, pp. 454–458.

Bagley, E. B.: "Discontinuity in the Flow Curve of Polyethylene," In Journal of Applied Physics, vol. 29, No. 1, January 1958, pp. 109–110.

Schulken, R. M.: "Cause of Melt Fracture; How It Is Related to Extrusion Behavior," In SPE Journal, April 1960, pp. 423–428.

Raff, R. A. V., Ed.: Crystalline Olefin Polymers, Part I, New York, Interscience, c. 1965, pp. 465–468; 700–708.

Dilley, E. R.: "The Use of Chemical Blowing Agents in Direct Extrusion Expansion," In Trans. J. Plastics Inst., February 1966, pp. 17–21.

PHILIP E. ANDERSON, Primary Examiner

U.S. Cl. X.R.

18—14; 264—210, 292, 321